(12) United States Patent
Cardno

(10) Patent No.: US 9,852,576 B2
(45) Date of Patent: Dec. 26, 2017

(54) MARKETING SYSTEM FOR AWARDING OF MARKETING DOLLARS TO ASSOCIATED PRESELECTED USERS

(71) Applicant: New BIS Safe Luxco S.à r.l, Luxembourg (LU)

(72) Inventor: Andrew John Cardno, San Diego, CA (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 670 days.

(21) Appl. No.: 14/183,121

(22) Filed: Feb. 18, 2014

(65) Prior Publication Data

US 2014/0171183 A1 Jun. 19, 2014

Related U.S. Application Data

(63) Continuation-in-part of application No. PCT/NZ2012/000144, filed on Aug. 14, 2012.

(60) Provisional application No. 61/524,528, filed on Aug. 17, 2011.

(51) Int. Cl.
| | | |
|---|---|---|
| *G07F 17/00* | (2006.01) | |
| *G07F 19/00* | (2006.01) | |
| *G07F 17/32* | (2006.01) | |
| *G06Q 30/02* | (2012.01) | |
| *A63F 13/30* | (2014.01) | |

(52) U.S. Cl.
CPC ............ *G07F 17/323* (2013.01); *A63F 13/12* (2013.01); *G06Q 30/0212* (2013.01); *G06Q 30/0224* (2013.01); *G07F 17/32* (2013.01); *G07F 17/3255* (2013.01)

(58) Field of Classification Search
CPC .. G07F 17/32; G07F 17/3225; G07F 17/3227; G07F 17/323; G07F 17/3237; G07F 17/3239; G07F 17/3244; G07F 17/3255; G07F 17/34; G06Q 30/02; G06Q 30/0207; G06Q 30/0209; G06Q 30/0212; G06Q 30/0219; G06Q 30/0224; G06Q 30/0226; G06Q 30/0236; G06Q 30/0251; G06Q 30/0255
See application file for complete search history.

(56) References Cited

U.S. PATENT DOCUMENTS

| | | | |
|---|---|---|---|
| 6,270,409 B1 | 8/2001 | Shuster | |
| 7,341,518 B2 | 3/2008 | Muskin | |
| 2003/0045354 A1* | 3/2003 | Giobbi | G07F 17/32 463/40 |
| 2004/0077422 A1 | 4/2004 | Bryant et al. | |
| 2006/0189382 A1* | 8/2006 | Muir | G07F 17/32 463/29 |
| 2006/0214376 A1* | 9/2006 | Weller | A63F 1/00 273/292 |
| 2008/0058055 A1 | 3/2008 | LeMay et al. | |

(Continued)

OTHER PUBLICATIONS

International Search Report for corresponding application No. PCT/NZ2012/000144 dated Mar. 28, 2014 (9 pages).

(Continued)

*Primary Examiner* — Milap Shah
(74) *Attorney, Agent, or Firm* — Merchant & Gould P.C.

(57) ABSTRACT

A gaming device configured to operate in a marketing mode or a standard gaming mode dependent upon the determination of whether the user is a preselected user or not.

4 Claims, 9 Drawing Sheets

(56) References Cited

U.S. PATENT DOCUMENTS

| | | |
|---|---|---|
| 2008/0076572 A1* | 3/2008 | Nguyen .................. G07F 17/32 463/42 |
| 2008/0085772 A1 | 4/2008 | Iddings et al. |
| 2008/0139306 A1* | 6/2008 | Lutnick .................. G06Q 30/02 463/30 |
| 2008/0227551 A1 | 9/2008 | Kelly et al. |
| 2009/0048010 A1 | 2/2009 | Kroeckel et al. |
| 2009/0124376 A1* | 5/2009 | Kelly .................. G07F 17/3206 463/29 |
| 2010/0076842 A1 | 3/2010 | Berlec |
| 2010/0240448 A1 | 9/2010 | Keenan et al. |
| 2011/0045895 A1 | 2/2011 | Gagner et al. |
| 2011/0081964 A1 | 4/2011 | Acres |
| 2011/0202269 A1* | 8/2011 | Reventlow ............ G06F 21/316 701/533 |
| 2011/0263318 A1* | 10/2011 | Agarwal ................ G06Q 20/32 463/25 |
| 2012/0077594 A1 | 3/2012 | Carter |
| 2012/0142409 A1 | 6/2012 | Kelly et al. |
| 2012/0315984 A1* | 12/2012 | Carrico ............... G07F 17/3211 463/30 |
| 2013/0017884 A1* | 1/2013 | Price ...................... G07F 17/32 463/25 |
| 2013/0324237 A1* | 12/2013 | Adiraju ............... G07F 17/3223 463/29 |

OTHER PUBLICATIONS

International Search Report for corresponding application No. PCT/NZ2012/000144 dated Apr. 22, 2014 (8 pages).

* cited by examiner

MARKETING SYSTEM FOR AWARDING OF MARKETING DOLLARS TO ASSOCIATED PRESELECTED USERS

This application is a Continuation-in-Part Application of PCT/NZ2012/000144, filed 14 Aug. 2012, which claims benefit of U.S. Provisional Ser. No. 61/524,528, filed 17 Aug. 2011 and which applications are incorporated herein by reference. To the extent appropriate, a claim of priority is made to each of the above disclosed applications.

FIELD OF THE INVENTION

The present invention relates to a marketing tool. In particular, the present invention relates to a marketing tool operating as a gaming device or marketing device that operates in various modes dependent on the user.

BACKGROUND

There are many methods and systems that exist that attempt to incentivise a person to use a gaming machine. The majority of these methods and systems merely encourage or tempt a user to access the gaming machine by providing a credit or reward if the user complies with the conditions of use of the credit or reward.

For example, a $25 voucher may be provided to a potential user which is then redeemed upon the user spending a specified amount on a gaming machine.

As another example, free play points may be provided to a potential user upon the user accessing a gaming machine. Subsequently, once the free play points are used up, the operators of the gaming machines hope that the users of the machines then start gambling with their own money.

Further, free credits or reward points are also offered while a user is gambling on a gaming machine when a particular result arises from playing the machine. This is done in an attempt to keep a player playing the machine by providing an increase in the perceived winnings.

However, these methods and systems do not provide sufficient encouragement for a user to continue playing on the gaming machine once any free credit or free play points have been used.

When gambling on a gaming machine, it is beneficial to the machine operators for users of the machine to win either the first time that they use that machine or at least early on in the process. This is because this provides the user with a certain level of satisfaction which they then want to repeat.

However, it is not legally permitted to provide a fixed outcome on gaming machines.

An object of the present invention is to provide an improved experience for selected users of a marketing tool or to at least providing the public with a useful choice.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements.

According to one aspect, the present invention provides a gaming device configured to operate in a marketing mode or a standard gaming mode dependent upon the determination of whether the user is a preselected user or not.

According to a further aspect, the present invention provides a marketing device having first and second marketing modes of operation, the marketing device configured to operate in the first marketing mode upon detection that a user of the marketing device is a preselected user, and in the second marketing mode upon detection that a user of the marketing device is not a preselected user, wherein the marketing device is further configured to operate in a win mode upon detecting the user has won, and operate in a lose mode upon detecting the user has lost, such that when the marketing device is configured to operate in the lose mode and the first marketing mode simultaneously, the marketing device further configured to make a predetermined payout to the preselected user in a manner that indicates to the user that the marketing device is operating in the win mode without making any indication to the preselected user that they have been preselected.

According to a further aspect, the present invention provides a marketing and communications system comprising a system controller; a user database, a communication system in communication with a plurality of gaming devices, each of the gaming devices having an identification reading device, wherein the identification reading device is configured to read identification data associated with the user, and the system controller is configured to i) detect whether the identification data being read is associated with a user in the user database and ii) communicate an offer to a mobile device associated with the identified user in the user database upon detection that the identification data being read is associated with a known user.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
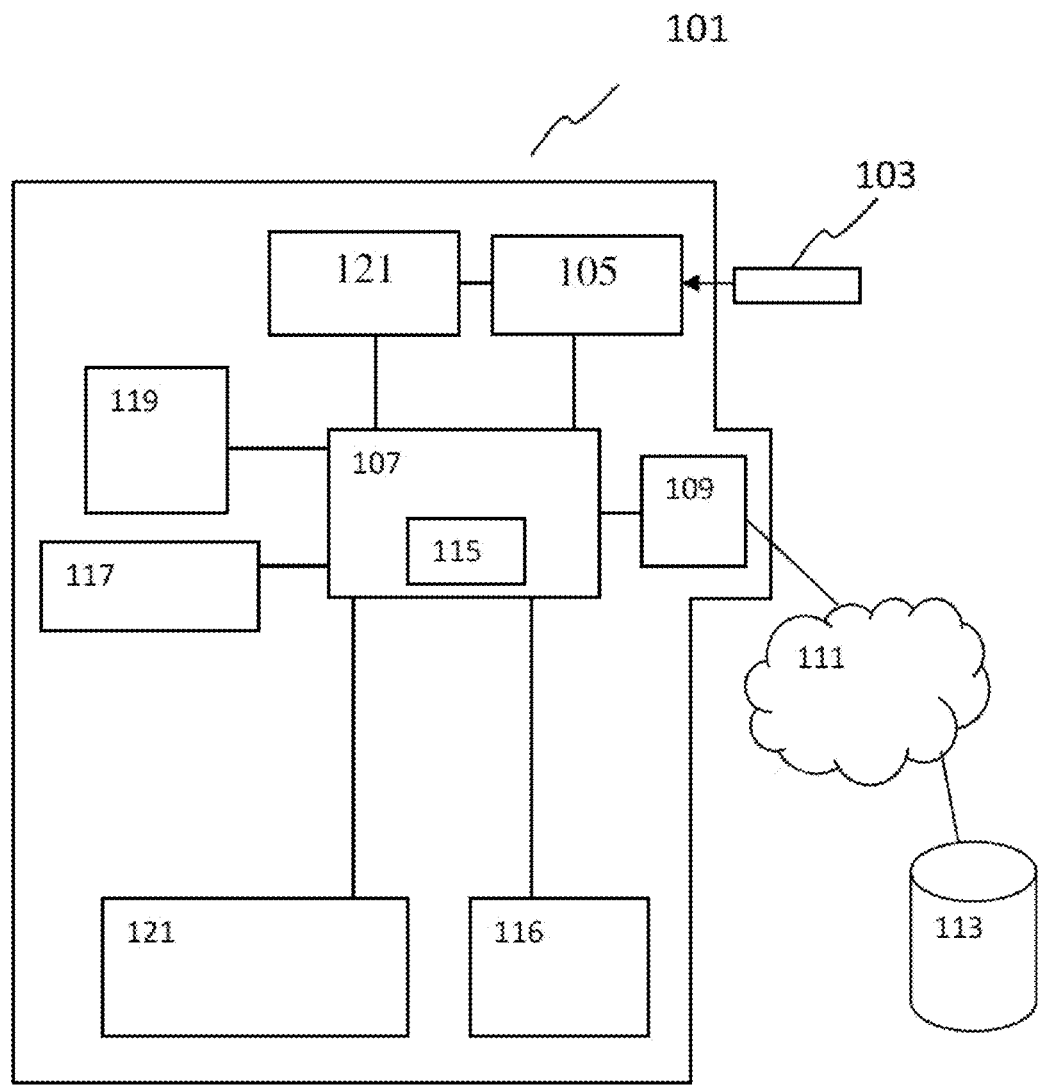
FIG. 1 shows a conceptual system diagram according to an embodiment of the present invention.

Embodiments of the present invention are described herein with reference to a gaming or marketing system adapted or arranged to perform various methods.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard, operating buttons or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

It will be understood that the system herein described includes one or more elements that are arranged to perform the various functions and methods. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific gaming system or gaming device.

First Embodiment

The herein described description describes a marketing tool that operates as a gaming device, marketing device, or marketing gaming device (collectively known as a "gaming device" herein) and delivers a marketing event in a probabilistic form.

The result output from the gaming device is in some cases predetermined and in other cases the result is not predetermined dependent upon whether the user of the gaming device is part of a predefined group, or in other words dependent upon whether the user of the gaming device is a predefined user. Therefore, the odds of any one user of the gaming device winning are different.

The gaming device uses a random number generator to determine when a first group of people can win during a gambling sequence. In this case, the result output is not predetermined.

Further, the system utilises a stored set of identifiers that identify users who have been selected to win regardless of the number generated by the random number generator.

In other words, the random number generator disguises the fact that there are one group of users who can win a prize regardless of the odds of winning the prize, and another group of users who must rely on the random number generator to win a prize. However, all groups of users think they are playing a random game, whereas for the predefined users there is nothing random in them winning a prize. Therefore, the probability of a user winning a prize mainly varies depending on whether the user is part of a predefined group.

According to one embodiment, the gaming device is a slot machine.

Referring to FIG. 1, initially the user of the gaming device 101 inserts their loyalty card 103 into a card reader 105 in communication with the device 101. Upon inserting the loyalty card 103 into the card reader 105, the card reader 105 reads information associated with the user that is stored on the card 103 and sends this information to a controller 107.

The controller 107 sends the information to a communication module 109. The communication module 109 transmits this received information via a network 111 to a database 113. The database reads the received information to determine the user of the gaming device. Upon determination of the user, marketing information associated with that user is retrieved from the database 113.

The information retrieved from the database includes group indication data which identifies whether the user is included within a predetermined marketing group of users. That is, a number of users are identified and grouped together for the purposes of a defined marketing strategy. For example, particular users may be identified based on one or more of the following characteristics: amount of money spent over a defined period in a gaming environment; amount of earning potential; proximity to a gaming environment, etc;

It will be understood that the group indication data may identify one or more users as being included within a predetermined marketing group.

The group indication data is then returned via the network 111 to the communication module 109 back to the controller 107.

A mode selection module 115 analyses the group indication data to determine a marketing mode in which the gaming device is to operate. That is, the gaming device is arranged to operate in a number of different marketing modes depending on the group indication data returned from the database 113, as will be explained further below.

The following portion of the description applies to a "win mode" of the gaming device. The win mode is not a type of marketing mode but is a mode which the gaming device enters upon the device being operated to cause a win to occur. That is, the following portion of the description describes how the gaming device operates during a standard win procedure. This win procedure applies where the group indication data identifies the user as being included in a defined marketing group as well as when the group indication data identifies that the user is not included in a defined marketing group.

The gaming device displays the game on a display 116 where the game displayed is one that the user has indicated they want to play. For example, if the gaming device is able to play multiple games, the user indicates by selecting their choice of game. If the gaming device is only able to play a single game, this game is automatically initiated upon the user inserting their loyalty card and pressing the start button.

Data within the loyalty card as read by the card reader 105 also indicates the amount of credit that the user has for use on gaming devices. This credit amount is displayed alongside the game which the user is play. If the user has no more credit, they are able to obtain credit by inserting payment into the gaming device using any suitable payment mechanism. This credit is then applied to the loyalty card.

Upon the user initiating the start of the game play, the controller 107 initiates a random number generator 117 in order to automatically generate a random number. This generated random number is returned back to the controller 107. The controller 107 looks up the generated random number within a prize table 119 to determine whether the generated random number is associated with a particular prize. It will be understood that the prize table is stored on any suitable storage medium that can be accessed by the controller.

It will be understood that the user may initiate the start of the game play using any suitable user interface 121 as part of the gaming device. For example, the user interface may be a touch screen, button, lever, motion sensor, movement sensor or indeed any other suitable user interface or any combination thereof.

If the prize table indicates the generated random number is associated with a particular prize, that prize is awarded to the user in the usual manner in which prizes are awarded on gaming machines. For example, a win is indicated on the display of the gaming machine identifying the amount that the user has won. Further, the winning display associated with the random number is also shown. For example, a winning sequence of reels associated with that prize is shown.

A winning distribution module 121 is then instructed by the controller 107 to update the amount of credit on the loyalty card by initiating the card reader to update the information on the loyalty card. It will be understood that the card reader not only has the functionality of reading data on the loyalty card also has the functionality of writing, amending or deleting data stored on the loyalty card.

The following portion of the description describes when the gaming devices operating in a "lose mode". When the gaming devices operating in the "lose mode", this is when the controller 107 initiates the marketing modes.

In the case where the controller and mode selection module have detected that the user is not part of a predetermined marketing group, the gaming machine is configured to operate in a first marketing mode. In this first marketing mode, if the random number generator does not generate a random number that is associated with a prize, the user of the gaming device does not receive a prize. That is, the controller looks up the random number generated by the random number generator in the prize table, and determines that no prize is to be awarded based on the combination of no prize been allocated for the random number generated on the determination that the user is not associated with a predefined marketing group.

However, in the case where the controller and mode selection module have detected that the user is part of a predetermined marketing group, the gaming machine is configured to operate in a second marketing mode different to the first marketing mode, if the random number generator does not generate a random number that is associated with a prize, the controller of the gaming device operates a subroutine as follows.

The controller 107 determines from the marketing information previously received from the database 113 a predefined marketing dollar amount that is associated with the predefined marketing group. That is, the information retrieved from the database 113 indicates a marketing dollar amount associated with a particular group of users. This dollar amount has been indicated as being available for use by the users within the predefined marketing group.

The controller then determines from the prize table the winning display that is associated with this marketing dollar amount. That is, the controller determines which game win indicator the game would need to display in order to be associated with the predefined marketing dollar amount. That is, the game win indicator may be a defined sequence of reels in a reels type game, such as a slot machine. Alternatively, the game win indicator may be a sequence of cards in a video poker type game.

The controller then instructs the user interface 121 to display that game win indicator on the game display 116. As before, the winning distribution module 121 is then instructed by the controller 107 to update the amount of credit on the loyalty card by initiating the card reader to update the information on the loyalty card.

The information associated with a particular marketing group may define how many times the user is able to win a predefined amount. Alternatively, the information may define a total amount which the user is able to win over a predefined number of plays or within a predefined time period.

Therefore, when a user is selected by the gaming entity operating the gaming environment to be part of a predefined marketing group, they are awarded marketing dollars without being made aware that they are being issued with marketing dollars. Further, in the event that the selected user wins a prize on the game using standard gaming techniques, the same prize is awarded to the selected user as would be awarded to a user who has not been identified as being part of a predefined marketing group. Therefore, all users still have the same odds of winning the indicated prizes for the gaming device. However, preselected user is who are part of the predefined marketing group also win marketing dollars which they may then use to operate further gaming devices.

Figure 2:
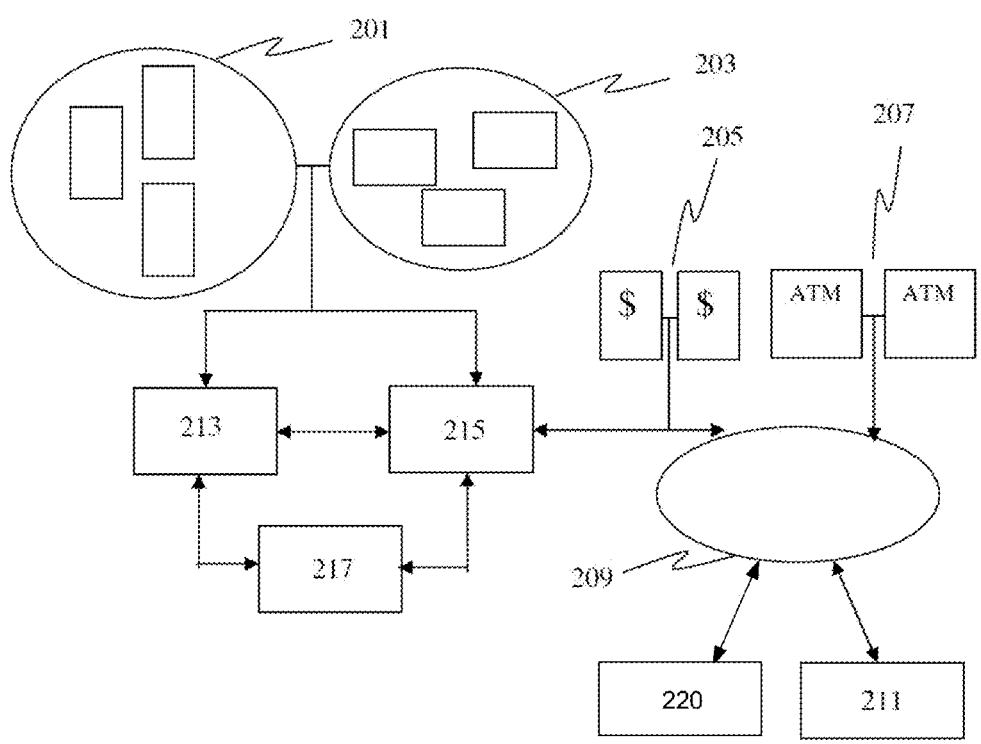
FIG. 2 shows a system diagram of a gaming environment according to an embodiment of the present invention.

FIG. 2 shows an example of how the herein described system may be incorporated within a gaming environment. The gaming environment consists of a number of gaming machines 201 and electronic tables 203 (among other electronic gaming devices) that are adapted to communicate electronically with other systems using any suitable protocols, such as data packet protocols. The herein described system may be included with either of these two groups of devices.

The gaming environment further includes a number of electronic cashier devices 205 and ATMs 207 which are in communication via a Wide Area Network 209 with one or more financial databases 211. The gaming environment further includes a wireless network 220.

Data from the gaming machines 201 and electronic tables 203 are transferred to and from a reward program database 213 and customer database 215. It will be understood that these two databases may be combined into a single database.

Data from the cashier devices are also transferred to the reward program database 213 and customer database 215. The databases 213 and 215 are in communication with a central hotel management system 217 that oversees the operation of the gaming environment, including the activities of customers in other areas of a casino, such as shops, hotels, spas etc.

The system 219 described herein is in communication with the reward program database 213, customer database 215 and central hotel management system 217 so the system can retrieve all necessary data about the activities within the gaming environment. The various embodiments as described herein are employed by the system 219 to provide an output 221.

Figure 3:
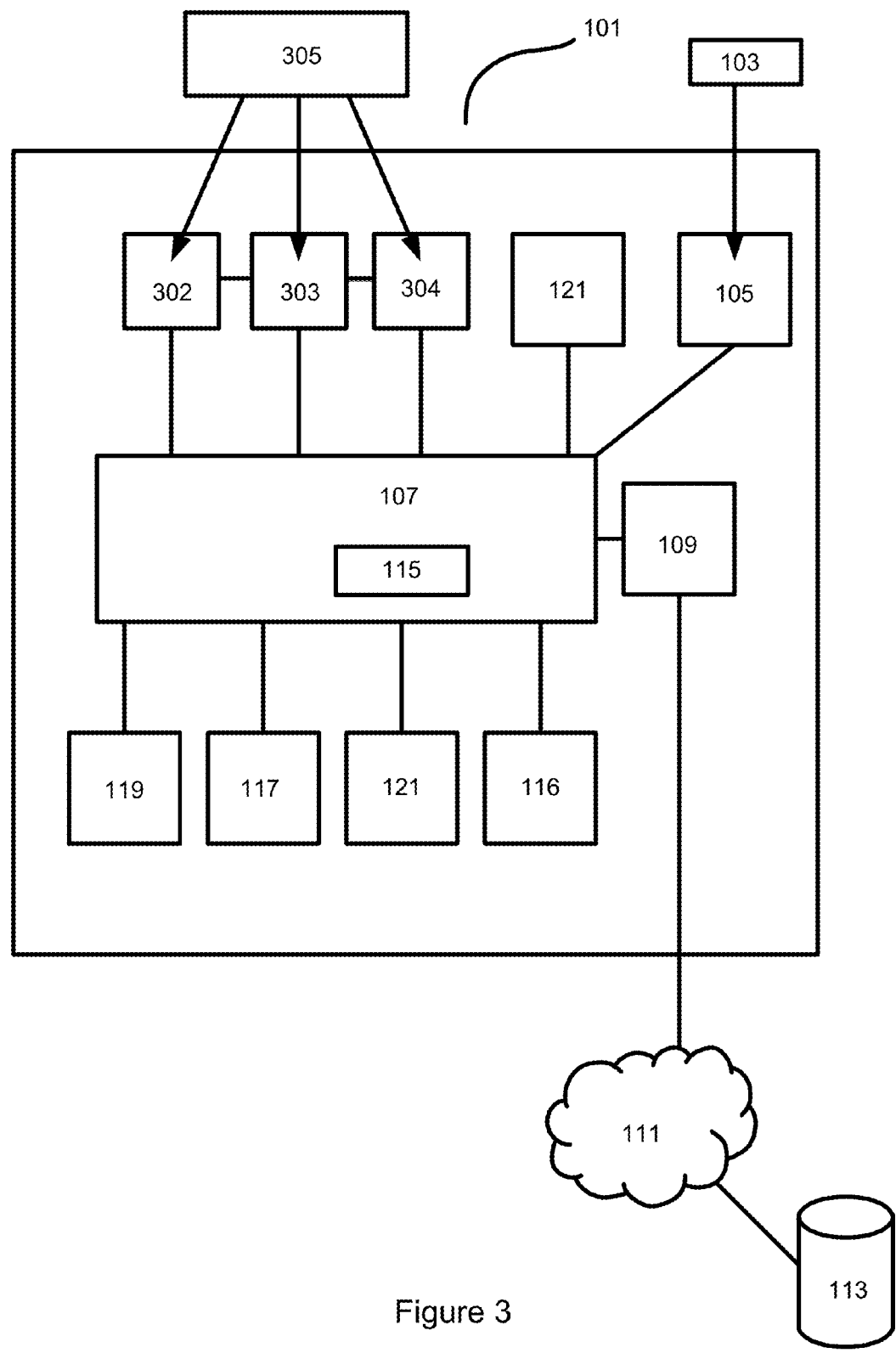
FIG. 3 shows a conceptual system diagram according to a further embodiment of the present invention.

According to a further embodiment seen in FIG. 3 the gaming device of the present invention is a slot machine 101 equipped with a near field communication (NFC) tag 302 for use with a mobile device 305.

The slot machine 101 may additionally be equipped with a charger 302 for a mobile device 305. The charger 302 may be a conventional charging system wherein the user plugs their mobile device 305 in or more preferably a wireless charging pad that uses inductive charging to charge the mobile device 305. The charger would be located near to the NFC tag 302

Additionally the slot machine 101 may be equipped with a communication device 304 that enables the mobile device 305 to communicate with gaming device 101.

Referring to FIG. 3, initially the user of the gaming device 101 places their mobile device near the NFC tag 302 in communication with the device 101. The NFC tag 302 using near field communication with the mobile device 305 receives at a minimum, a unique ID number that is associated with the user and sends this information to a controller 107.

It is necessary for the unique ID number of the mobile device 305 to have previously been associated with the user in the database 113. This association can be created by the user linking the ID number of the mobile device 305 with their stored user profile.

As previously described the controller 107 sends the information to a communication module 109. The communication module 109 transmits this received information via a network 111 to a database 113. The database 113 reads the received information to determine the user of the gaming device 101. Upon determination of the user, marketing information associated with that user is retrieved from the database 113. The marketing information is then used with the gaming device 101 in the manner previously described.

Figure 4:
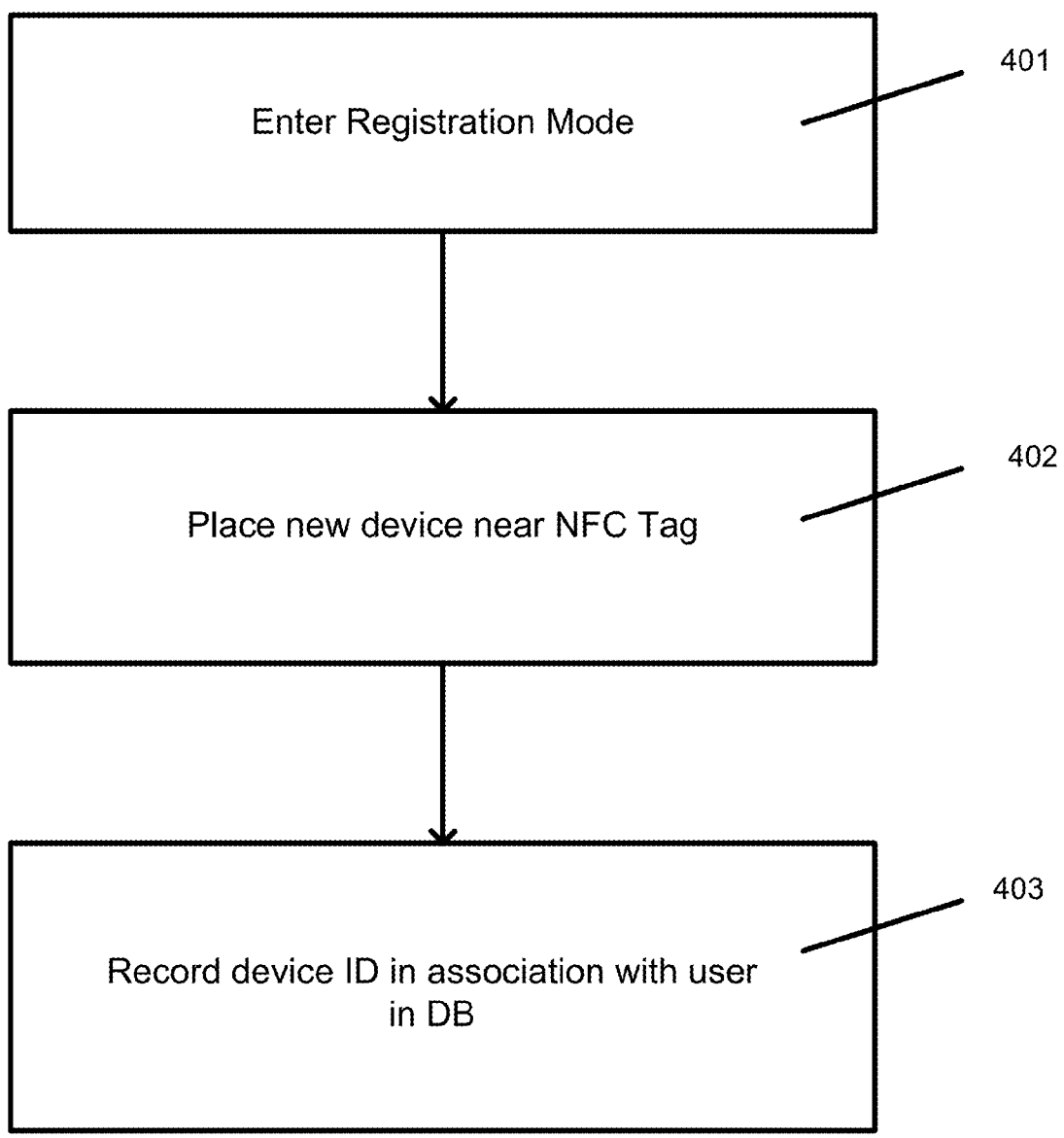
FIG. 4 shows a flow diagram of the user registering a new mobile device according to an embodiment of the present invention.

In one embodiment of the invention the user could register a new mobile device 305 ID number using the slot machine 101. They could do this by identifying themselves to the slot machine 101 using for example a loyalty card 103 or a previously registered mobile device ID and referring to FIG. 4 selecting the register new mobile device mode of the gaming device 101.

The user would then following on screen instructions to register the new mobile device. The user would place their mobile device 205 near the NFC tag 302 allowing the system to receive the mobile device ID. The system as part of the register new mobile device ID mode would then associate the mobile device ID of the new mobile device 305 with the user's record in the database 113.

Once a mobile device 305 has been identified by the NFC tag 302 the system could additionally using either near field communications, or optionally using bluetooth or wifi communications display information and or offers to the user using the display of their mobile device 305. Such information and or offers might be displayed using an application on the mobile device that is automatically activated by the NFC tag once the user has placed their device near to the tag.

In order for the slot machine 101 to optionally communicate with the mobile device 305 using bluetooth or wifi. The slot machine 101 would optionally be equipped with a bluetooth communication device 303 and a wifi communication device 304. The bluetooth communication device 303 and wifi communication device 304 form part of the system wireless network 220.

The application on the mobile device 305 could be installed on mobile devices that are NFC enabled or installed on devices which are not NFC enabled. In order for the system controller 217 to identify the user in the customer database 215 it is necessary for the application to authenticate the user to the system controller 217. In one embodiment the user would provide information such as a username and password to the application via an input screen of the application to enable the application to authenticate the user to the system controller 217. Once the user of the application is authenticated the system controller 217 will link the application to with the user's record in the customer database.

The application would be able to receive push notifications from the system controller 217 and be able to request information from the system controller 217.

While the use of NFC tags 302 and/or bluetooth 303 and wifi 304 communication devices has been described with reference to a slot machine 101, the NFC tag 302 and/or bluetooth 303 and wifi 304 communication devices could equally be located on a gaming table or other gaming device.

If the user's mobile device is not NFC enabled in order for the system to identify the slot machine 101 or other gaming device a user is playing the system controller 217 tracks when a user inserts their players or loyalty card 103 into a card reader 105 of a gaming device 101. When the card is in the reader 105 the system controller 217 knows that the user associated with the card 103 is using the particular gaming device.

While described as inserted the players or loyalty card 103 could be a swipe card which would be swiped or could be an NFC enabled card which would be placed near the NFC tag on the gaming device 101.

The application on the mobile device 305 would be able to communicate with the system controller 217 via the system wireless network 220 including Wi-Fi and or cellular data channels even when the mobile device 305 was not near a NFC tag of a gaming device 101 or in the situation where the mobile device was not NFC enabled.

Figure 5:
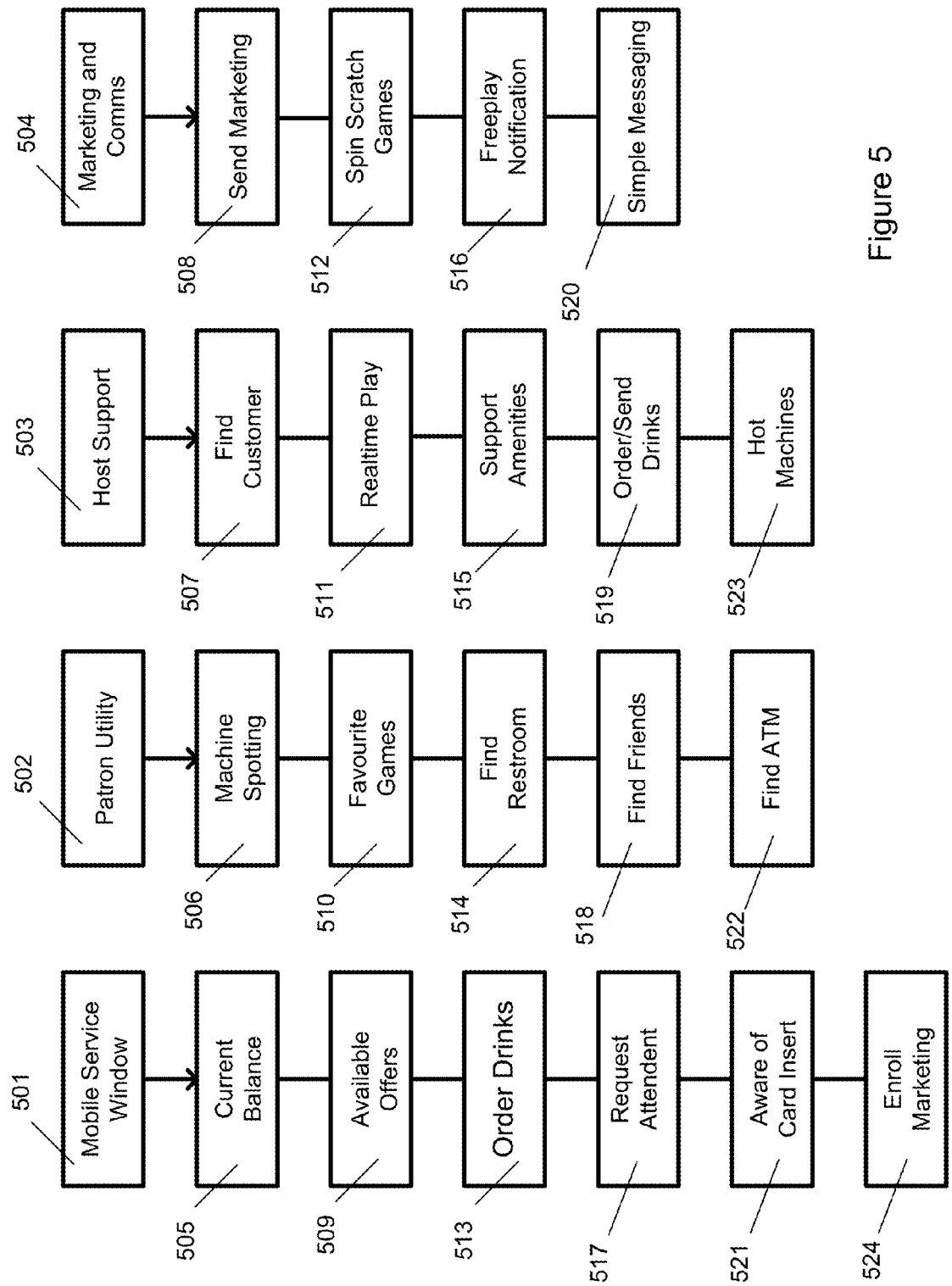
FIG. 5 shows a conceptual system diagram of the mobile application according to an embodiment of the present invention.

Referring to FIG. 5 the application would have various modules that interact with the system including offering a user a Mobile Service Window 501 and a Patron Utility 502. Additionally the system would provide the system manager Host Support 503, and Marketing and Communications 504. Each of these module groupings would be further broken down as described below.

The Mobile Service Window 501 would allow a user to obtain their current balance 505, see available offers 509, order drinks and food 513, request and attendant 517, be notified of player's card insert 521 and enroll in marketing 524.

Figure 6:
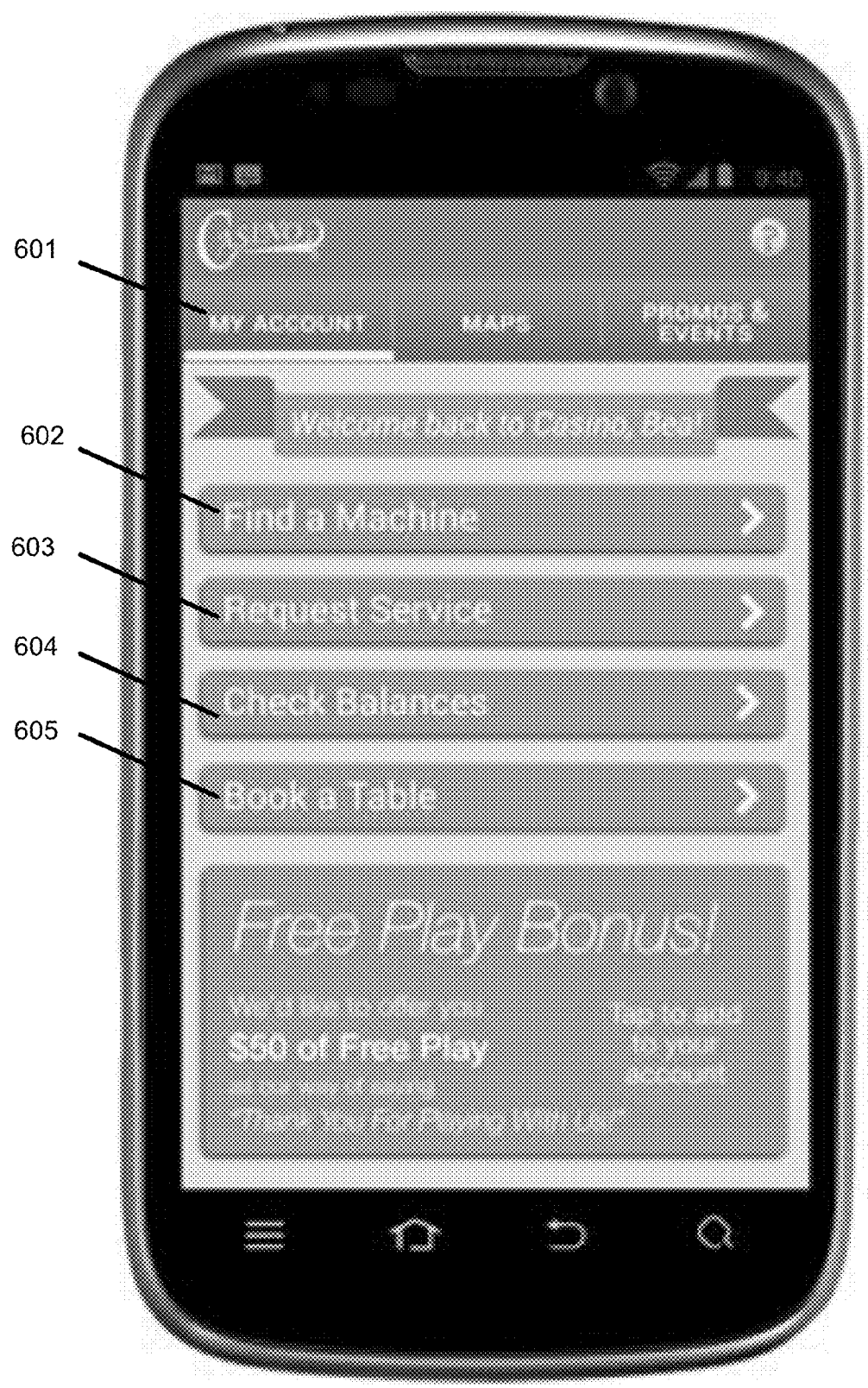
FIG. 6 shows an example screen shoot of the application of the present invention on a mobile device.

In addition it is envisaged the application would enable a user to make a reservation in a restaurant, book/reserve a slot machine, book the rental of other devices, book a valet, book a taxi, order drinks and or food, essentially the application would enable a user to book any number of services that are offered within the establishment. FIG. 6 shows an example screen shot of the application on a mobile device showing 'My Account' 601 and various services such as 'Find a Machine' 602, 'Check Balances' 603 and 'Book a Table' 604'. The other items listed above such as 'Book a Taxi' would be shown on other screens.

The Patron Utility 502 would allow a user to find a machine 506, find machines with their favourite games 510, find the restroom 514, find friends 518 or find an ATM 522

Other information that could be provided by the application includes obtaining a list of any new machines, information on how to improve the user's chances of winning, a tutorial on using the application itself, the ability to display the registered device user's casino win/loss statement, the display of responsible gaming information and any required legal information.

Figure 7:
FIG. 7 shows a further example screen shoot of the application of the present invention on a mobile device.
Figure 8:
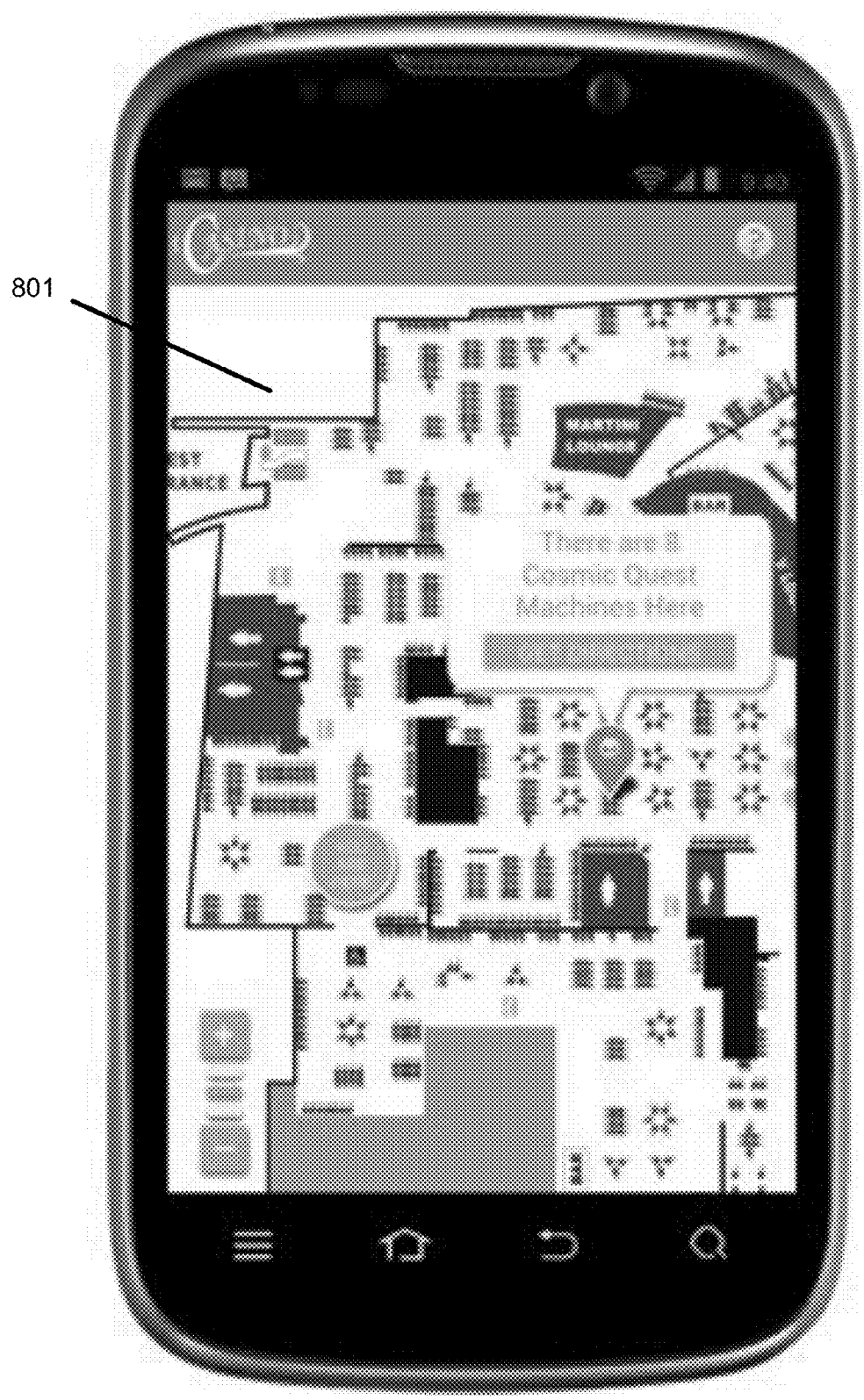
FIG. 8 shows a further example screen shoot of the application of the present invention on a mobile device showing a map of a casino layout.
Figure 9:
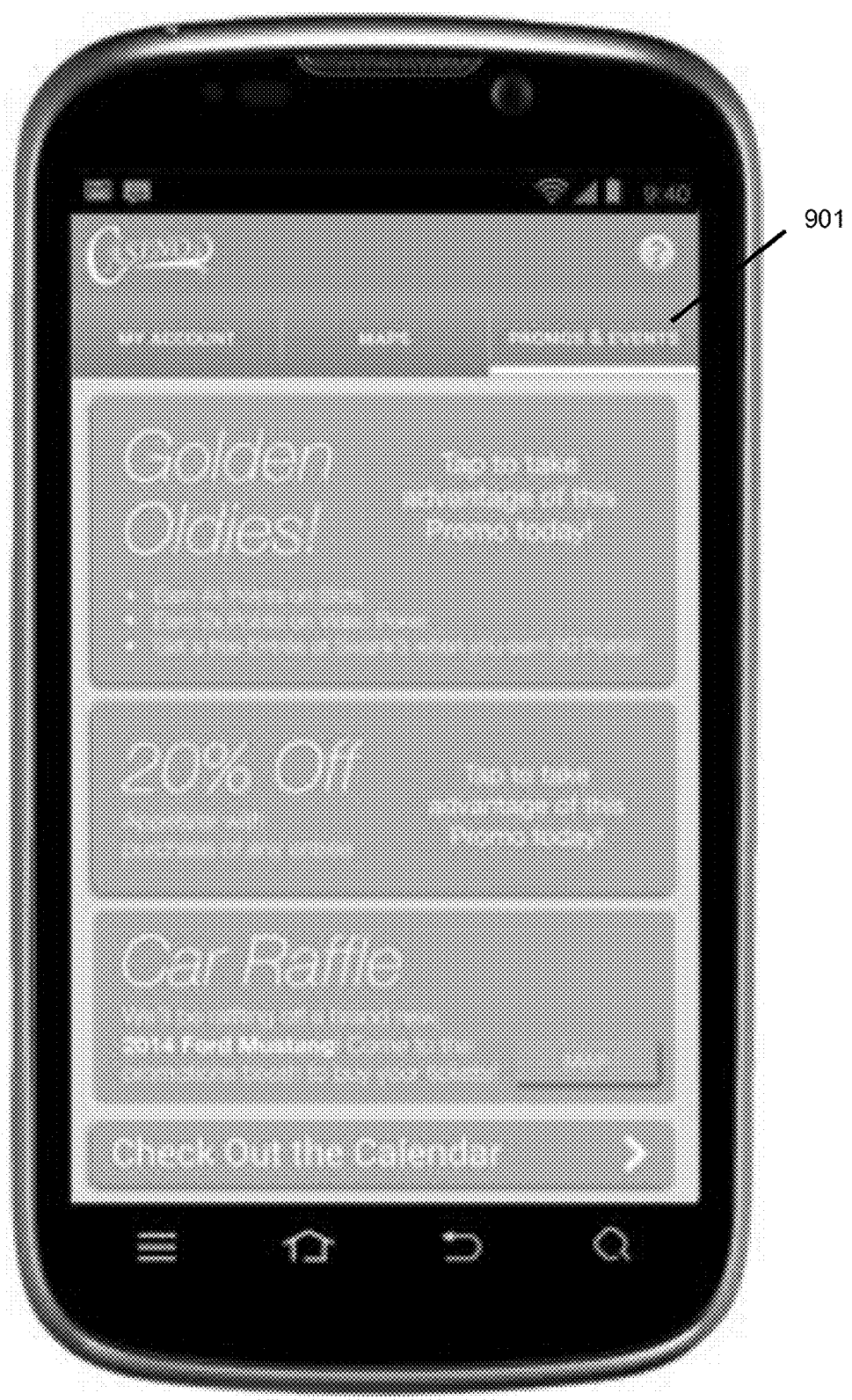
FIG. 9 shows a further example screen shoot of the application of the present invention on a mobile device showing offers made to the device user.

The application would also enable a user to display a map of slot machines, open or available slot machines, restrooms, ATM, restaurants, shops and identify the user's location. The application has the ability to provide the user with directions from their current location to a preferred slot machine or to the restrooms or to any one of the mapped items. Referring to FIGS. 7 and 8 the map component of the application is shown. The user selects from the options tab Maps 701 and is offered the choice of maps to find and identify 'Game Machine' 701, 'Bars and Restaurants' 703, 'Cashiers' 704, Restrooms' 705 and 'Player's Club' 706. A map of a facility is shown in FIG. 8 801.

The application also has the ability to remember the user's favourite food and or drinks, the user's favourite gaming machine and other personal history.

Further the application allows the facility operator, using an operator interface the ability to provide 'Host Support' 503 and 'Marketing and Communications' 504.

Host support 503 would include finding a customer 507, supervising real-time play 511, information on support amenities 515, order and send a drink to a patron 519 and identify hot machine 523.

Marketing and Communications would allow the facility operator to send marketing offers to the user application 508, including for example spin scratch games 512, freeplay notification 516 and even simple user messaging 520.

In one embodiment the system 117 would communicate tailored offers via the user's mobile device 305 having identified the slot machine 101 that the user is playing. The offers could be tailored depending upon the user based on information on the user stored in the customer database 215 and the slot machine/gaming device 101 the user is currently playing. The slot machine 101 the user is playing would be identified in the case on an NFC enabled mobile device 305 by the mobile device 305 being in communication with the slot machine 101 NFC tag 302. In the case of a non NFC enabled mobile device 305 the system would identify the machine 101 that the user is playing based on the user's loyalty card 103 being in the machine card reader 105.

In the case of a non NFC enabled mobile device 305 the tailored offer may be sent only if the mobile device is connected to a wireless network 220 associated with the system controller 117. This would prevent offers being made to a mobile device 305 when the mobile device 305 is not with the user.

The tailored offer may only be displayed for a limited period of time and may be removed from display on the mobile device 305 after a period of time or when the mobile device 305 is no longer in contact with the NFC tag of the gaming machine 101 or when the user's card is no longer in the card slot 105 of the gaming machine 101.

It will be understood that the embodiments of the present invention described herein are by way of example only, and that various changes and modifications may be made without departing from the scope of invention.

The invention claimed is:
1. A marketing and communications system comprising:
a system controller;
a user database; and
a communication system configured to facilitate communications between the system controller, the user database, and a plurality of gaming devices, each of the gaming devices having:
at least one processor;
at least one memory device in communication with the at least one processor and configured to store a prize table;
a loyalty card reader;
an identification reading device, wherein the identification reading device is a near field communication (NFC) tag configured to read identification data associated with a first user from a user NFC tag, wherein the system controller is configured to i) detect whether the identification data being read is associated with a user in the user database including whether the associated user is a preselected user in a predetermined marketing group and an amount of marketing dollars allocated to the associated user, and ii) communicate information regarding the first user to the gaming device, the information including whether the first user is the preselected user in the predetermined marketing group;
a display device;
a user interface;
a networking device; and
a random number generator,
wherein the memory device is configured to store program instructions executable by the processor to operate the gaming device, the program instructions including instructions to:
receive the information associated with the first user;
receive an indication from the user interface that the first user has initiated game play;
initiate the random number generator to generate a random number;
receive the generated random number from the random number generator, look up the generated random number within the prize table to determine if a prize is associated with the generated random number;

when no prize is associated with the generated random number in the prize table and the first user is the preselected user in the predetermined marketing group, award a prize from the marketing dollars allocated to the first user; and display the prize to the first user, using the display device, without the first user being made aware that the first user has been awarded a prize from the marketing dollars.

2. The marketing and communications system of claim 1 wherein the system controller is further configured to iii) communicate an offer to a mobile device associated with the first user identified in the user database upon detection that the identification data being read is associated with a known user and wherein the offer depends on the gaming device associated with the identification reading device.

3. The marketing and communications system of claim 2 wherein the offer additionally depends on the identified user.

4. The marketing and communications system of claim 2 wherein the user NFC tag is part of the mobile device.

\* \* \* \* \*